United States Patent
Ruck et al.

(12) 
(10) Patent No.: US 11,940,270 B2
(45) Date of Patent: Mar. 26, 2024

(54) EXTENDED STYLUS FOR A COORDINATE MEASURING MACHINE

(71) Applicant: Carl Zeiss Industrielle Messtechnik GmbH, Oberkochen (DE)

(72) Inventors: Otto Ruck, Pfahlheim (DE); David Höcherl, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 173 days.

(21) Appl. No.: 17/209,756

(22) Filed: Mar. 23, 2021

(65) Prior Publication Data
US 2021/0302144 A1 Sep. 30, 2021

(30) Foreign Application Priority Data
Mar. 25, 2020 (DE) ............ 10 2020 108 162.6

(51) Int. Cl.
*G01B 5/016* (2006.01)
*G01B 5/20* (2006.01)
(Continued)

(52) U.S. Cl.
CPC ............ *G01B 5/016* (2013.01); *G01B 5/20* (2013.01); *G01B 5/201* (2013.01); *G01B 7/001* (2013.01); *G01B 21/045* (2013.01)

(58) Field of Classification Search
CPC .. G01B 5/016; G01B 2210/60; G01B 21/047; G01B 5/012; G01B 21/04
See application file for complete search history.

(56) References Cited

U.S. PATENT DOCUMENTS 1,953,614 A * 4/1934 King .................. B25D 5/02
33/642
2,076,819 A * 4/1937 Jones .................. B23Q 15/22
33/642
(Continued)

FOREIGN PATENT DOCUMENTS

DE 1905909 A1 11/1969
DE 102009008722 A1 8/2010
(Continued)

OTHER PUBLICATIONS

Intellectual Property Office, Patents Act 1977: Search Report under Section 17 for Application No. GB2103682.7, dated Nov. 12, 2021.

*Primary Examiner* — John Fitzgerald
*Assistant Examiner* — Tania Courson
(74) *Attorney, Agent, or Firm* — Miller Johnson

(57) ABSTRACT

A coordinate measuring machine for measuring coordinates or properties of a workpiece includes an extended stylus. The extended stylus includes an extension element and a connection element. The extension element includes a carrier portion mounted at the connection element so as to be rotatable about an axis of rotation. The extension element includes, on a side remote from the connection element, a shaft portion that is aligned so as to deviate from the axis of rotation. The coordinate measuring machine includes a measurement head to which the extended stylus is attached. The measurement head is configured to measure deflections of the stylus resulting from contacts of the extended stylus to the workpiece.

20 Claims, 3 Drawing Sheets

(51) Int. Cl.
*G01B 7/00* (2006.01)
*G01B 21/04* (2006.01)

(56) References Cited

U.S. PATENT DOCUMENTS

| | | | | |
|---|---|---|---|---|
| 2,665,492 A * | 1/1954 | Freimark | ............ | B23Q 17/225 33/639 |
| 3,512,261 A * | 5/1970 | Viollet | ............ | B25H 7/04 33/DIG. 1 |
| 3,531,868 A | 10/1970 | Stevenson | | |
| 4,349,946 A * | 9/1982 | McMurtry | ............ | B23Q 3/15553 409/126 |
| 4,567,672 A * | 2/1986 | Honda | ............ | G01B 7/008 33/559 |
| 4,637,119 A * | 1/1987 | Schneider | ............ | G01B 7/012 33/561 |
| 4,938,083 A * | 7/1990 | Gurny | ............ | G01B 7/012 73/866.5 |
| 5,327,657 A * | 7/1994 | Hajdukiewicz | ............ | G01B 5/012 33/503 |
| 5,339,535 A * | 8/1994 | McMurtry | ............ | G01B 7/002 33/561 |
| 6,360,176 B1 * | 3/2002 | Nishioki | ............ | G01B 7/012 702/56 |
| 6,430,828 B1 | 8/2002 | Ulbrich | | |
| 6,543,150 B2 * | 4/2003 | Matsumiya | ............ | G01B 7/012 33/DIG. 13 |
| 6,708,420 B1 * | 3/2004 | Flanagan | ............ | G01B 7/012 33/561 |
| 7,503,125 B2 * | 3/2009 | Jordil | ............ | G01B 21/047 33/503 |
| 7,676,942 B2 * | 3/2010 | Jordil | ............ | G01B 11/03 33/503 |
| 8,312,635 B2 * | 11/2012 | Jordil | ............ | G01B 5/012 33/503 |
| 8,365,426 B2 * | 2/2013 | Ruck | ............ | G01B 5/012 33/503 |
| 9,140,532 B2 * | 9/2015 | Brenner | ............ | G01B 5/008 |
| 10,794,678 B2 * | 10/2020 | Brenner | ............ | G01Q 60/38 |
| 2001/0034948 A1 | 11/2001 | Matsumiya et al. | | |
| 2006/0101660 A1 | 5/2006 | Takanashi | | |
| 2011/0258868 A1 | 10/2011 | Jordil et al. | | |
| 2012/0079731 A1 | 4/2012 | Ruck | | |
| 2017/0191815 A1 | 7/2017 | Chardonnens et al. | | |
| 2018/0094923 A1 | 4/2018 | Sagemueller et al. | | |

FOREIGN PATENT DOCUMENTS

| | | |
|---|---|---|
| DE | 102009045261 A1 | 4/2011 |
| DE | 102015119440 A1 | 3/2017 |
| DE | 102016118572 A1 | 4/2018 |
| DE | 102017003641 A1 | 10/2018 |
| EP | 3184960 A1 | 6/2017 |
| GB | 1197145 A | 7/1970 |

\* cited by examiner

EXTENDED STYLUS FOR A COORDINATE MEASURING MACHINE

CROSS-REFERENCE TO RELATED APPLICATIONS

This application claims priority to German Application DE 10 2020 108 162.6 filed Mar. 25, 2020, the entire disclosure of which is incorporated by reference.

FIELD

The invention relates to industrial metrology and more particularly to measuring a workpiece using a coordinate measuring machine with an extended stylus.

BACKGROUND OF THE INVENTION

In workpieces with sites that are hard to access, not all measurement tasks can be achieved satisfactorily with the aid of known coordinate measuring machines. This is true in particular when performing measurements on components with higher order rotational symmetry, such as small gearwheels or blisks, i.e. components made in one piece having blades arranged around a core, in particular a disk. The blades frequently have a geometrically highly complex structure. The measurement on such workpieces can result in deflections that are difficult to control, in particular in the case of gimbal-mounted sensors, and thus lead to a hardly predictable path behavior during the measurement. The use of many different probes for measurements increases the outlay and complexity relating to the measurement considerably and, in addition, is unable to completely satisfactorily solve the problem.

SUMMARY OF THE INVENTION

It is an object of the present invention to make possible a measurement of coordinates or properties of a workpiece that is more advanced in terms of its functionality and with respect to the known drawbacks than the prior art.

This object is achieved by an extended stylus of the type mentioned in the introductory part, wherein the extended stylus has an extension element and a connection element, wherein the extension element has a carrier portion that is mounted on the connection element so as to be rotatable about an axis of rotation, wherein the extension element has on its side that is remote from the connection element a shaft portion that is aligned so as to deviate from the axis of rotation, and wherein the connection element has at least one line for transmitting signals. Such an extended stylus allows precise and reliable measurements on workpieces having sites that are difficult to access. The complexity of the system used for the measurement can be kept relatively low owing to the use of an extended stylus according to the invention.

The connection element can preferably have at least one line for transmitting signals for controlling the rotation of the extension element relative to the connection element. The extended stylus can thus be aligned according to the movement of the constituent parts of the coordinate measuring machine and/or of the workpiece.

To keep both the electrical and the mechanical system complexity low, it may be expedient if the connection element has an interface for a 1-Wire bus for transmitting control signals. Complicated cabling can in particular be avoided thereby.

With respect to the construction of the bus system used for the control, it may be advantageous to provide an asynchronous interface for transmitting control signals.

A probing contact element can be arranged advantageously at the end of the shaft portion of the extension element.

The precision of the measurement can be increased if the center of the preferably spherical probing contact element lies on the axis of rotation of the extended stylus.

The connection element of the extended stylus can expediently be embodied such that it can be fitted directly or via an articulated positioning device at a measurement head of a coordinate measuring machine.

In an advantageous configuration, the extended stylus can have a circuit for electronic identification. In this way, reliable control in connection with a compatible bus system, for example a 1-Wire bus, can be ensured.

The connection element can advantageously be embodied as a rotary plate.

The object on which the invention is based is also achieved by a coordinate measuring machine having an extended stylus according to the invention. The extended stylus can here be connected to the measurement head via an articulated positioning device. Essential advantages arise here corresponding to the advantages of the extended stylus.

The object on which the invention is based is also achieved by a method for measuring coordinates or properties of a workpiece, in which a measurement head that measures in a Cartesian manner and has an extended stylus according to the invention or one of its configurations is used. Essential advantages of the method arise here analogously to the advantages of the extended stylus.

In order to measure particularly reliably and precisely, a rotational movement of the extension element of the extended stylus can be controlled on the basis of the movement of the measurement head and/or on the basis of the movement of the workpiece.

The angular position of the axis of rotation of the extended stylus can advantageously be changed for the measurement on the workpiece.

It may be expedient to continuously capture the angular position of the axis of rotation.

BRIEF DESCRIPTION OF THE DRAWINGS

Further features and advantages of the invention will become apparent from the following description of example embodiments with reference to the drawings, in which.

DETAILED DESCRIPTION

Figure 1:
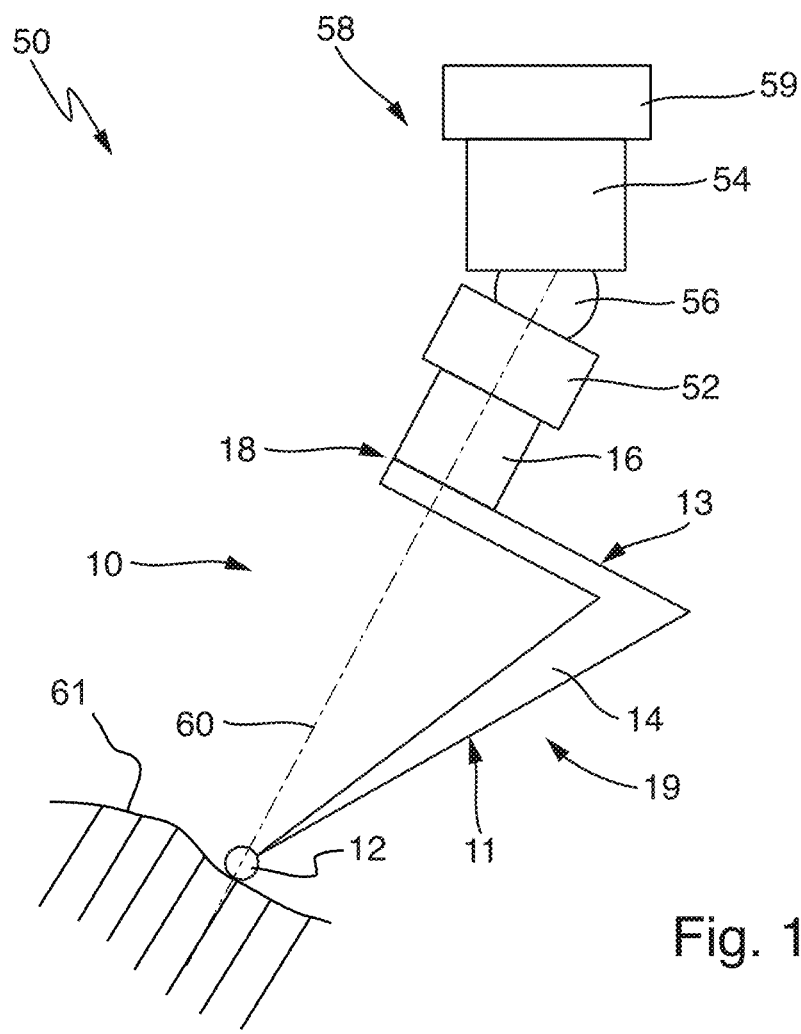
FIG. 1 is a probing system with an extended stylus according to a first example embodiment in a greatly simplified side view.

FIG. 1 shows a probing system, denoted with 50 overall, having an extended stylus 10, which has a connection element 16. The extended stylus 10 can be attached operationally reliably to a receptacle element 52 of a positioning device 58 by means of the connection element 16. The positioning device 58 is connected so as to be exchangeable via a change interface to a measurement head 59 that measures in a Cartesian manner, with the measurement head for its part being attached to the quill of a coordinate measuring machine. A measurement head that is suitable therefor is sold by the applicant under the name VAST®.

In the example shown, the receptacle element 52 of the positioning device 58 is connected via a joint apparatus 56 to a base element 54 of the positioning device 58. The joint apparatus 56 can here be designed, for example, as a rotary joint, as a ball-and-socket joint, or as a rotary pivoting joint. The joint of the joint apparatus 56 is preferably controllable via a bus system (which is not illustrated in more detail).

The connection element 16 of the extended stylus 10 can be connected to the receptacle element 52 for example by means of a thread. The extended stylus 10 can preferably be fitted and removed at the positioning device 58. It is advantageous in this regard if the connection between the connection element 16 and the receptacle element 52 is releasable and closable with little effort.

The extended stylus 10 is equipped with an extension element 14, which has a carrier portion 13 and a shaft portion 11. The carrier portion 13 of the extension element 14 is arranged rotatably at the connection element 16. The shaft portion 11 in the example shown is designed as a stylus 19 and carries at its end that is remote from the carrier portion 13 a probing contact element 12.

The carrier portion 13 of the extension element 14 forms with the connection element 16 a rotary joint 18 having an axis of rotation 60. The extension element 14 of the extended stylus 10 is rotatable with respect to the connection element 16 about the axis of rotation 60 of the extended stylus 10. To control this rotation, the connection element 16 has a two-wire line (not illustrated in more detail in the drawing), which is connected to a bus system of the measurement head.

The shaft portion 11 of the extension element 14 of the extended stylus 10 is aligned so as to deviate from the axis of rotation 60. In the example shown, the shaft portion 11 is aligned at an angle with respect to the axis of rotation 60.

In the example shown, the shaft portion 11 is straight and arranged at an angle that is not equal to 0° or not equal to 180° with respect to the carrier portion 13 of the extension element 14. In deviation from what is illustrated in the drawing, the shaft portion 11 of the extension element 14 can also have one or more bends.

The geometry of the extended stylus 10 is preferably such that the center of the spherical probing contact element 12 lies on the axis of rotation 60 or intersects it.

The positioning device 58 for measuring coordinates or properties of a workpiece 61 can alternatively also be attached to a robot.

The control of the joint apparatus 56 of the positioning device 58 and of the rotary joint 18 of the extended stylus 10 is preferably effected such that it is integrated in the control of the coordinate measuring machine or of the robot.

It is possible to provide one or more extensions between the connection element 16 of the extended stylus 10 and the receptacle element 52. Preferably a two-wire line for the connection element 16 is also implemented in the case of such an extension. In another example embodiment, the connection element is attached directly to the measurement head rather than via the positioning device 58.

Figure 2A:
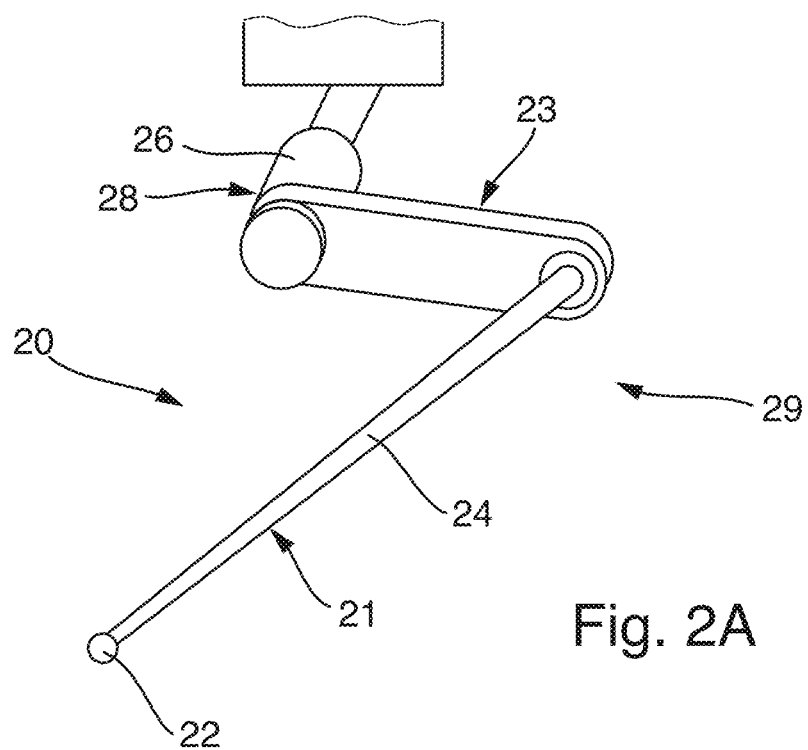
FIG. 2A is an extended stylus according to a further example embodiment in a first position in a perspective view.
Figure 2B:
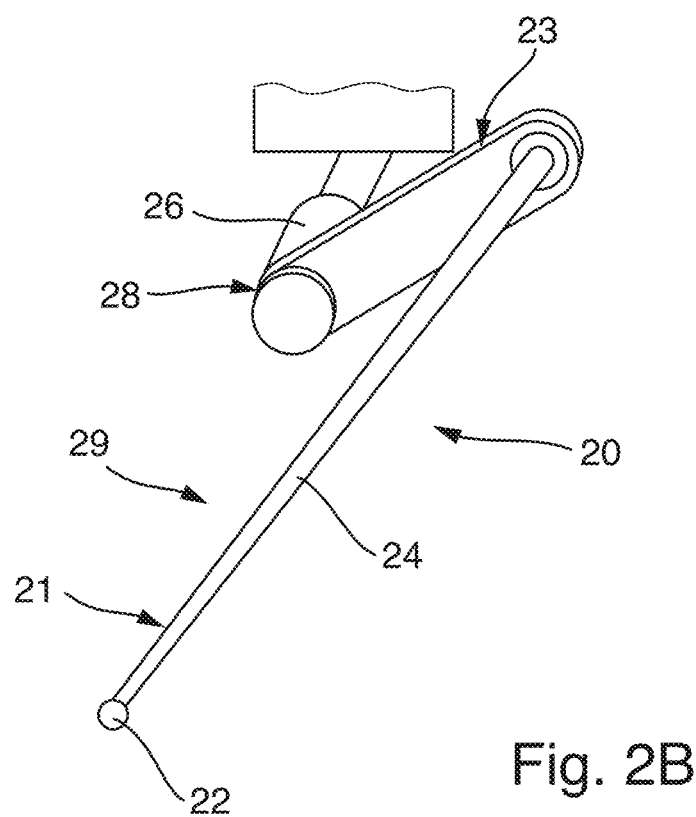
FIG. 2B is the extended stylus according to FIG. 2A in a second position in a perspective view.

FIGS. 2A and 2B show an extended stylus 20 with an extension element 24, which has a carrier portion 23 and a shaft portion 21. A spherical probing contact element 22 is arranged at the end of the extension element 24 on the side of the shaft portion 21 to form a stylus 29. At the other end of the extension element 24 on the side of the carrier portion 23, the extension element 24 is connected to a connection element 26 so as to be rotatable about an axis of rotation. The carrier portion 23 and the connection element 26 of the extended stylus 20 form a rotary joint 28 with an axis of rotation.

FIG. 2A shows the extended stylus 20 in a first rotational position. FIG. 2B shows the extended stylus 20 in a second rotational position, which differs from the first rotational position. In both rotational positions, the center of the spherical probing contact element 22 lies on the axis of rotation of the rotary joint 28 of the extended stylus 20.

The shaft portion 21 is also aligned at an angle with respect to the axis of rotation of the rotary joint 28 and thus in deviation from the axis of rotation in the example shown in FIGS. 2A and 2B.

The extended stylus 20 shown in FIGS. 2A and 2B can be advantageously used in connection with a rotary table for the workpiece. The extended stylus 20 shown here is suitable especially for measuring what are known as blisks. If the rotation of the rotary table is accompanied by a corresponding rotation of the extended stylus 20, the relative arrangement between the shaft portion 21 and the blisk can be obtained.

In the example shown in FIGS. 2A and 2B, the centerpoint of the probing contact element 22 that is in the form of a probe sphere is always located at least approximately on the axis of rotation of the extended stylus 20. By rotation about the rotary joint 28, the probing contact element 22 is not moved to a different position, but the stylus 29 can be aligned such that it does not touch the workpiece to be measured. For this reason it may be sufficient to provide a measurement element of relatively simple construction, such as a potentiometer, in such an extended stylus 20 that is rotatable with a controlled motion. In this way, a cost-effective implementation can be made possible.

The use of a curved stylus 29 can be advantageous for example for measuring on workpieces that are particularly difficult to access.

Figure 3A:
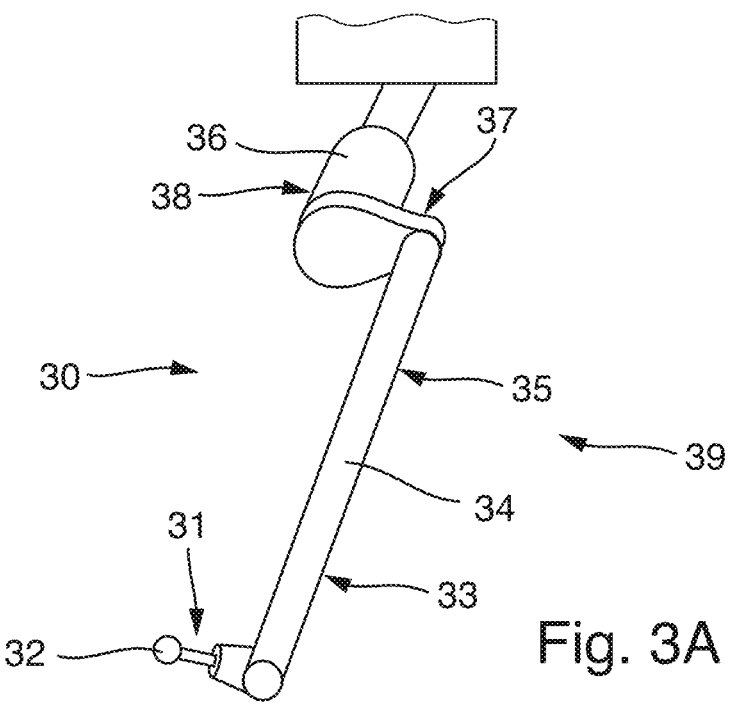
FIG. 3A is an extended stylus according to a further example embodiment in a first position in a perspective view.
Figure 3B:
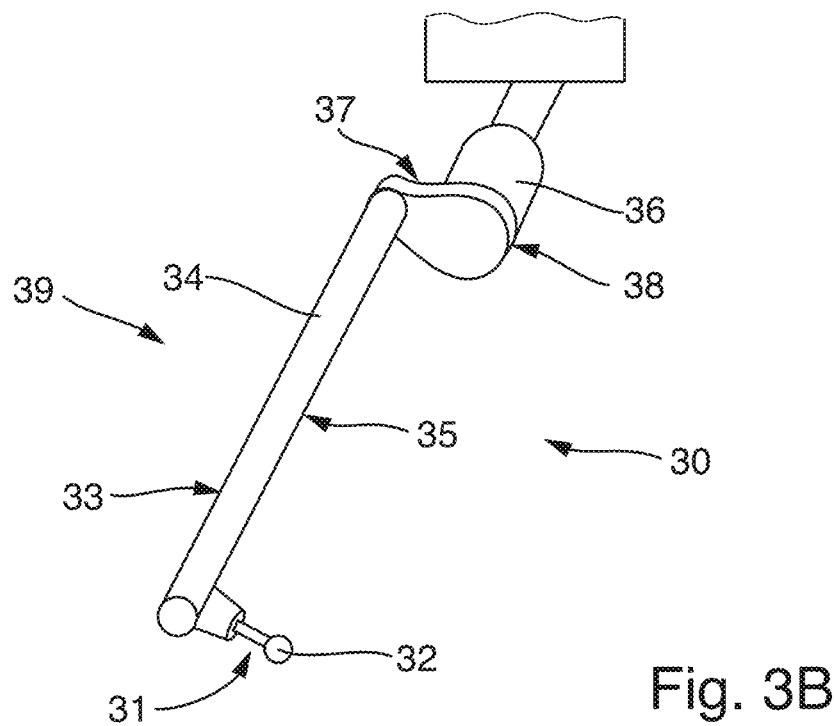
FIG. 3B is the extended stylus according to FIG. 3A in a second position in a perspective view.

FIGS. 3A and 3B show an extended stylus 30 with an extension element 34, which has a carrier portion 33 and a shaft portion 31. On a first side, the shaft portion 31 is connected in the example shown to the carrier portion 33. On the opposite side, the shaft portion 31 carries a probing contact element 32, whereby a stylus 39 is formed.

The carrier portion 33 of the extension element 34 according to FIGS. 3A and 3B has a first portion 37 and a second portion 35. The first portion 37 and the second portion 35 of the carrier portion 33 are arranged at an angle with respect to one another, wherein this angle is 90° in the example. The second portion 35 of the carrier portion 33 extends between the first portion 37 and the shaft portion 31 of the extension element 34. The shaft portion 31 is arranged at an angle, 90° in the example, with respect to the second portion 35 of the carrier portion 33.

The first portion 37 of the carrier portion 33 is connected to the connection element 36 of the extended stylus 30. The first portion 37 of the carrier portion 33 and the connection element 36 of the extended stylus 30 form a rotary joint 38 with an axis of rotation. The extension element 34 can be rotated relative to the connection element 36 about the axis of rotation of the rotary joint 38.

FIG. 3A shows the extended stylus 30 in a first rotational position. FIG. 3B shows the extended stylus 30 in a second rotational position, which differs from the first rotational position. In both rotational positions, the probing contact element 32 lies on the axis of rotation of the rotary joint 38 of the extended stylus 30. The shaft portion 31 is aligned perpendicularly to the axis of rotation and thus in deviation from the axis of rotation in the example embodiment of the extended stylus 30 shown in FIGS. 3A and 3B.

The stylus 39 shown as an example in FIGS. 3A and 3B is particularly suitable for the measurement of relatively small rotationally symmetric workpieces without a rotary table. In the example shown in FIGS. 3A and 3B, the centerpoint of the probing contact element 32 that is in the form of a probe sphere is also always located at least approximately on the axis of rotation of the extended stylus 30. The example of an extended stylus 30 shown here makes for example the scanning measurement of an annular groove, a tooth or a complete gear set on closed and/or overlapping scanning trajectories possible. The measurement with such an extended stylus 30 in connection with a positioning device 58 (see FIG. 1), which is provided with an axis of rotation or with a rotary swivel axis as the joint apparatus 56, is particularly advantageous.

In the examples shown in FIGS. 1, 2A, 2B, 3A and 3B, the probing contact element 12, 22, 32 is a sphere. Alternatively, the probing contact element 12, 22, 32 can be formed as a cylinder. The connection element 16, 26 and 26, respectively, (indicated schematically in the FIGS.) of the extended stylus 10, 20 and 30, respectively, can be embodied for example as a rotary plate or a rotary cylinder.

Mounting the extended stylus 10, 20, 30 to a receptacle element 50 can also be effected in a direction that deviates from the direction that is shown by way of example in the FIGS. A positioning device 58 can be provided with one or more extended stylus 10, 20, 30 according to the invention. For complex measurement tasks, it may be expedient to use a plurality of extended stylus 10, 20, 30.

The rotatable stylus 19, 29, 39 of the extended stylus 10, 20, 30 preferably changes its orientation continuously corresponding to the movement of the positioning device 58, of the coordinate measuring machine, or of the robot.

The rotation of the extended stylus 10, 20, 30 about its axis of rotation 60 is controlled preferably by means of a bus system. To this end, the connection element 16, 26, 36 has a corresponding interface that can be integrated, for example, into the connection element 16, 26, 36. The connection element 16, 26, 36 preferably has an asynchronous interface.

The two-wire line provided for control in the connection element 16, 26, 36 can provide a supply voltage and serve for establishing a connection between a microcontroller, provided as the master, and other microcontrollers, which are provided as slaves. The microcontrollers can be provided in this case with what is known as a UART ("universal asynchronous receiver transmitter") circuit. The connection element 16, 26, 36 can preferably have an interface for what is called a 1-Wire bus for transmitting control signals.

The extended stylus 10, 20, 30 is preferably provided with a circuit for electronic identification, e.g. an ID chip. It may be expedient to read such a circuit by means of a 1-Wire bus.

In connection with a corresponding bus system, e.g. a 1-Wire bus, an extended stylus 10, 20, 30 according to the invention can represent a CNC axis of the control of a coordinate measuring machine. During a scanning operation, the axis of rotation 60 of the extended stylus 10, 20, 30 can be aligned on the basis of the nature of a workpiece, for example such that the shaft portion 11, 21, 31 of the stylus 19, 29, 39 comes as close as possible to the surface normal or that contacts of the stylus 19, 29, 39 with interfering contours of the workpiece are avoided. In this case, preferably the angular position of the axis of rotation 60 of the extended stylus 10, 20, 30 can be captured continuously. The angular position captured can thus influence the computational actual position of the probing contact element 12, 22, 32 and the flexural strength.

If the center of the probing contact element 12, 22, 32, which is in the form of a probe sphere, for example, intersects with the axis of rotation 60, the control of the overall system is made easier. In addition, less accurate and thus cheaper angle encoders can then be used to achieve the same overall accuracy of the coordinate measuring machine.

For example an asynchronous interface with TTL ("transistor-transistor logic") circuit technology can be used as the 1-Wire bus. The 1-Wire bus can be used to transfer the voltage supply, the system clock, and information to the subscribers of the bus and to measure the instantaneous current consumption thereof. The control apparatus of the coordinate measuring machine or of one of its satellites preferably forms the master of the bus system, while the other subscribers participate as slaves, preferably with a fixed slave address. The line to be used for the bus can also be used as a master for ID chips.

The master in the bus system can transmit a start character to the bus with an own clock assigned to the system clock, which start character is used for all slaves to synchronize the own timers. Owing to further information in the same dataset, the value of the time stamps in the microcontrollers of the slaves is set equal to the time stamp of the control of the coordinate measuring machine. In this way, all measurement values generated there can now be combined in a later transmission with the data of the control.

Further following characters contain the address of the slave and information to the slave, e.g. the target angular position of the axis of rotation 60 (see FIG. 1). Accordingly, the voltage supply, e.g. 5 V, is present at one of the lines until the start of the next clock cycle. The master supplies this voltage and the high pulses in the data simultaneously to all slaves that buffer this supply voltage in capacitors so that the supply thereof is maintained during the low phases of the signal.

In the case of all slaves, the synchronization with the clock is generated with the falling edge of the "start bit." This is the standard protocol of the asynchronous interface. For this reason it is sufficient if the line is placed only at one receiving input ("RX") of a microcontroller and the first edge is used as an interrupt or as a trigger. Whenever the data line has a high level, the slaves are provided with voltage and the respectively present capacitor is charged. Owing to the measurement of the current at the master, the latter can ascertain whether a motor or another consumer at a slave is currently active and can accordingly adjust its reaction with respect to the transmission of data. It is thus possible for example to also control electromagnets with a very high current consumption via such a 1-Wire bus, for example the electromagnets that are contained in the change interface of the measurement head or in the case of change magnets of, for example, plates. In such cases, the master can synchronize itself with the slave via the evaluation of the current consumption, without additional data transmission being necessary.

If very many data are intended to be transmitted from the slave to the master, the master must temporarily transfer control of the line to a slave, which then transmits data until its own supply voltage has reached a limit value. The slave then interrupts the further transmission of data and returns the control to the master, which then supplies the slaves with voltage again and can subsequently restart the transmission.

The phrase at least one of A, B, and C should be construed to mean a logical (A OR B OR C), using a non-exclusive logical OR, and should not be construed to mean "at least one of A, at least one of B, and at least one of C."

The invention claimed is:

1. A coordinate measuring machine for measuring coordinates or properties of a workpiece, the coordinate measuring machine comprising:
an extended stylus including an extension element, a probing contact element, and a connection element, wherein the extension element includes:
a carrier portion mounted at the connection element so that the carrier portion is rotatable about an axis of rotation relative to the connection element, and
on a side remote from the connection element, a shaft portion that is aligned so as to deviate from the axis of rotation, wherein the probing contact element is arranged at an end of the shaft portion and lies on the axis of rotation and wherein the carrier portion and the shaft portion are fixedly connected to each other; and
a measurement head to which the extended stylus is attached,
wherein the measurement head is configured to measure deflections of the extended stylus resulting from contacts of the extended stylus to the workpiece.

2. The coordinate measuring machine of claim 1, wherein the extended stylus is connected to the measurement head via an articulated positioning device.

3. The coordinate measuring machine of claim 2, wherein the articulated positioning device includes a receptacle element configured to receive the connection element of the extended stylus.

4. The coordinate measuring machine of claim 1, wherein the connection element of the extended stylus is attached to the measurement head via an articulated positioning device.

5. The coordinate measuring machine of claim 1, wherein the connection element is configured as a rotary plate.

6. A method for measuring coordinates or properties of a workpiece, comprising:
using the coordinate measuring machine of claim 1 to measure the workpiece; and
measuring deflections of the extended stylus resulting from the contacts of the extended stylus to the workpiece.

7. The method of claim 6, wherein the deflections are measured in a Cartesian manner.

8. The method of claim 6, wherein a rotational movement of the extension element of the extended stylus is controlled based on at least one of a movement of the measurement head or a movement of the workpiece.

9. The method of claim 6, wherein an angular position of the axis of rotation of the extended stylus is changed for the measurement on the workpiece.

10. The method of claim 6, wherein an angular position of the axis of rotation of the extended stylus is measured continuously.

11. An extended stylus for a coordinate measuring machine for measuring coordinates or properties of a workpiece, the extended stylus comprising:
a connection element;
a probing contact element; and
an extension element including:
a carrier portion mounted at the connection element so that the carrier portion is rotatable about an axis of rotation relative to the connection element, wherein the carrier portion extends from a first end proximate the connection element to a second end remote from the connection element, and
a shaft portion that is aligned so as to deviate from the axis of rotation and that is connected to the second end of the carrier portion,
wherein the probing contact element is arranged at an end of the shaft portion and lies on the axis of rotation, and
wherein the carrier portion and the shaft portion are non-rotatably connected to each other, and
wherein the extended stylus is configured to be attached to a measurement head of the coordinate measuring machine.

12. The extended stylus of claim 11, wherein the connection element of the extended stylus is configured to be attached via an articulated positioning device to the measurement head.

13. The extended stylus of claim 11, wherein the connection element is configured as a rotary plate.

14. The extended stylus of claim 11, wherein the carrier portion extends at a perpendicular angle from the axis of rotation.

15. The extended stylus of claim 11, wherein the measurement head is configured to measure deflections of the extended stylus resulting from contacts of the extended stylus to the workpiece.

16. The extended stylus of claim 11, wherein the carrier portion and the shaft portion are fixedly connected to each other.

17. The extended stylus of claim 11, wherein the carrier portion has an angled shape.

18. An extended stylus for a coordinate measuring machine for measuring coordinates or properties of a workpiece, the extended stylus comprising:
a connection element;
a probing contact element; and
an extension element including:
a carrier portion configured to rotate with respect to the connection element about an axis of rotation, wherein the carrier portion includes a first end connected to the connection element and a second end remote from the axis of rotation, and
a shaft portion including a first end fixedly connected to the second end of the carrier portion and a second end connected to the probing contact element, wherein the carrier portion and the shaft portion are arranged to locate the probing contact element on the axis of rotation throughout rotation of the extension element and wherein the extended stylus is configured to be attached to a measurement head of the coordinate measuring machine.

19. The extended stylus of claim 18, wherein the carrier portion has an angled shape.

20. The extended stylus of claim 18, wherein the measurement head is configured to measure deflections of the extended stylus resulting from contacts of the extended stylus to the workpiece.

* * * * *